US010889364B1

(12) United States Patent
Kwok et al.

(10) Patent No.: US 10,889,364 B1
(45) Date of Patent: Jan. 12, 2021

(54) AIRCRAFT FULL DEPTH PI PREFORM JOINTS

(71) Applicants: Ernest Kwok, Long Beach, CA (US); Christian Armenta, Redondo Beach, CA (US); Minh Truong, Cypress, CA (US); Nino Noel B. Las Pinas, Carson, CA (US); Gregory P. Wood, Melbourne, FL (US)

(72) Inventors: Ernest Kwok, Long Beach, CA (US); Christian Armenta, Redondo Beach, CA (US); Minh Truong, Cypress, CA (US); Nino Noel B. Las Pinas, Carson, CA (US); Gregory P. Wood, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 764 days.

(21) Appl. No.: 15/706,081

(22) Filed: Sep. 15, 2017

(51) Int. Cl.
*B64C 3/26* (2006.01)
*B64C 3/18* (2006.01)

(52) U.S. Cl.
CPC ............... *B64C 3/26* (2013.01); *B64C 3/185* (2013.01); *B64C 3/187* (2013.01)

(58) Field of Classification Search
CPC .......... B64C 3/26; B64C 3/185; B64C 3/187; B64C 3/20; B64C 1/12; B64C 3/182; B64C 9/02; B64C 3/18; B64C 1/065; B64C 1/064; B64C 1/06; B64C 3/14
See application file for complete search history.

(56) References Cited

U.S. PATENT DOCUMENTS

| | | | | |
|---|---|---|---|---|
| 4,565,595 A * | 1/1986 | Whitener | ........... | B29D 99/0003 156/156 |
| 4,671,470 A * | 6/1987 | Jonas | ............... | B29C 66/54 244/119 |
| 5,487,930 A * | 1/1996 | Lockshaw | ............... | B32B 15/04 428/53 |
| 5,616,376 A * | 4/1997 | Lockshaw | ................ | B32B 3/12 428/33 |
| 6,374,570 B1 * | 4/2002 | McKague, Jr. | ......... | B64C 1/064 52/762 |
| 6,520,706 B1 * | 2/2003 | McKague, Jr. | ..... | B29D 99/0003 403/265 |
| 7,244,487 B2 * | 7/2007 | Brantley | ............... | B29C 65/561 244/123.7 |
| 8,985,515 B2 * | 3/2015 | McCullough | ........... | F16B 17/00 244/131 |
| 9,625,361 B1 * | 4/2017 | Vail | ........................... | G01N 3/08 |
| 9,926,066 B2 * | 3/2018 | Ludin | ................... | E04B 1/1903 |
| 10,207,788 B2 * | 2/2019 | Ludin | .................... | B29C 66/54 |

(Continued)

*Primary Examiner* — Assres H Woldemaryam
(74) *Attorney, Agent, or Firm* — Tarolli, Sundheim, Covell & Tummino LLP

(57) ABSTRACT

A support structure for reinforcing first and second skins in an aircraft component includes a plurality of spars. A plurality of ribs is positioned on opposite sides of the spars. Each rib has a height extending from adjacent the first skin to adjacent the second skin. A plurality of first pis connects the ribs to the spars with each first pi having a length. A plurality of second pis secures the spars to the first and second skins. A plurality of third pis secures the ribs to the first and second skins. The first pis overlap with at least one of the second pis or the third pis.

20 Claims, 15 Drawing Sheets

(56) References Cited

U.S. PATENT DOCUMENTS

| | | | | |
|---|---|---|---|---|
| 2004/0140049 A1* | 7/2004 | Puriefoy | ............... | B29D 24/005 |
| | | | | 156/212 |
| 2006/0113451 A1* | 6/2006 | Kilwin | ................. | F16B 11/006 |
| | | | | 248/346.5 |
| 2014/0061385 A1* | 3/2014 | Dan-Jumbo | ............... | B64C 3/26 |
| | | | | 244/123.1 |
| 2014/0186572 A1* | 7/2014 | Arevalo Rodriguez | .. | B64C 1/12 |
| | | | | 428/99 |
| 2015/0336368 A1* | 11/2015 | Ross | ..................... | B32B 37/142 |
| | | | | 156/253 |
| 2015/0360764 A1* | 12/2015 | Eales | ......................... | B64C 3/26 |
| | | | | 244/131 |
| 2016/0194071 A1* | 7/2016 | Abe | ................. | B29C 66/12443 |
| | | | | 403/265 |
| 2019/0041241 A1* | 2/2019 | Schenck | ................ | B64D 45/00 |

* cited by examiner

AIRCRAFT FULL DEPTH PI PREFORM JOINTS

TECHNICAL FIELD

The present invention relates generally to aircraft components and, more specifically, to support structures for aircraft.

BACKGROUND

The use of pi performs in bonded composite structure for decreased weight and cost is challenging due to the limited information surrounding the most recent bonded structure systems. To this end, designing bonded pi structure joints is problematic in that small revisions significantly impact the assembly structure.

SUMMARY

One example support structure for reinforcing first and second skins in an aircraft component includes a plurality of spars. A plurality of ribs is positioned on opposite sides of the spars. Each rib has a height extending from adjacent the first skin to adjacent the second skin. A plurality of first pis connects the ribs to the spars with each first pi having a length. A plurality of second pis secures the spars to the first and second skins. A plurality of third pis secures the ribs to the first and second skins. The first pis overlap with at least one of the second pis or the third pis.

Another example support structure for reinforcing first and second skins in an aircraft component includes a plurality of spars. A plurality of ribs is positioned on opposite sides of the spars. Each rib has a height extending from adjacent the first skin to adjacent the second skin. A plurality of first pis connects the ribs to the spars. Each first pi extends from a first end to a second end to define a length. A plurality of second pis secures the spars to the first and second skins. A plurality of third pis secures the ribs to the first and second skins. Both the first end and the second end of the first pis overlap with the second pis and the third pis.

Other objects and advantages and a fuller understanding of the invention will be had from the following detailed description and the accompanying drawings.

DETAILED DESCRIPTION

Figure 1:
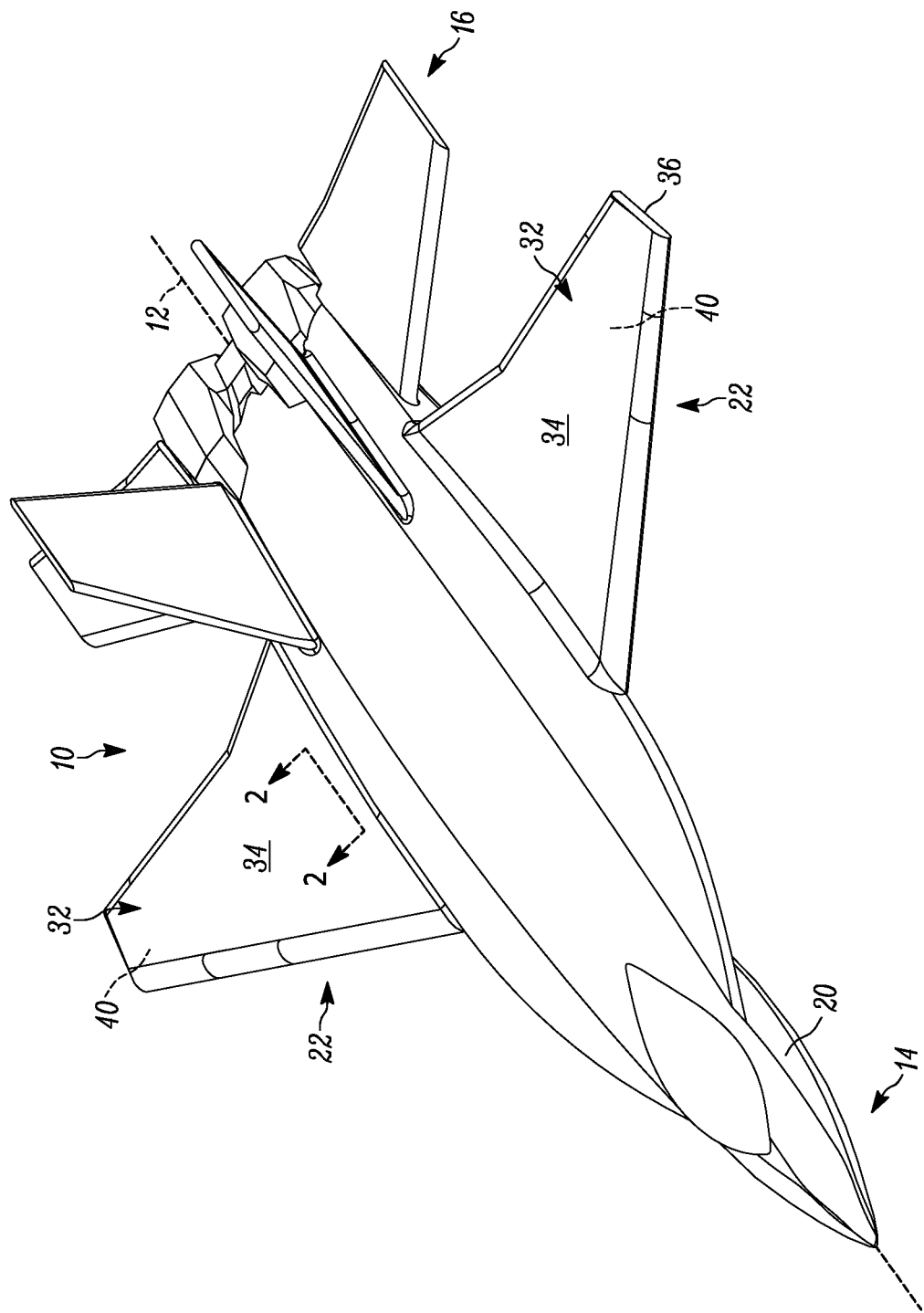
FIG. 1 is an aircraft including an example support structure.

The present invention relates generally to aircraft components and, more specifically, to support structures for aircraft. FIG. 1 illustrates an aircraft 10 including an example support structure 40 in accordance with the present invention. The aircraft 10 extends from a centerline 12 from a first or fore end 14 to a rear or aft end 16. The aircraft 10 includes a fuselage 20 extending generally along the centerline 12. A pair of wings 22 extends on opposite sides of the centerline 12 from the fuselage 20. Each wing 22 has an outer mold line (OML) 32 defined by an upper skin 34 and a lower skin 36.

Figure 2:
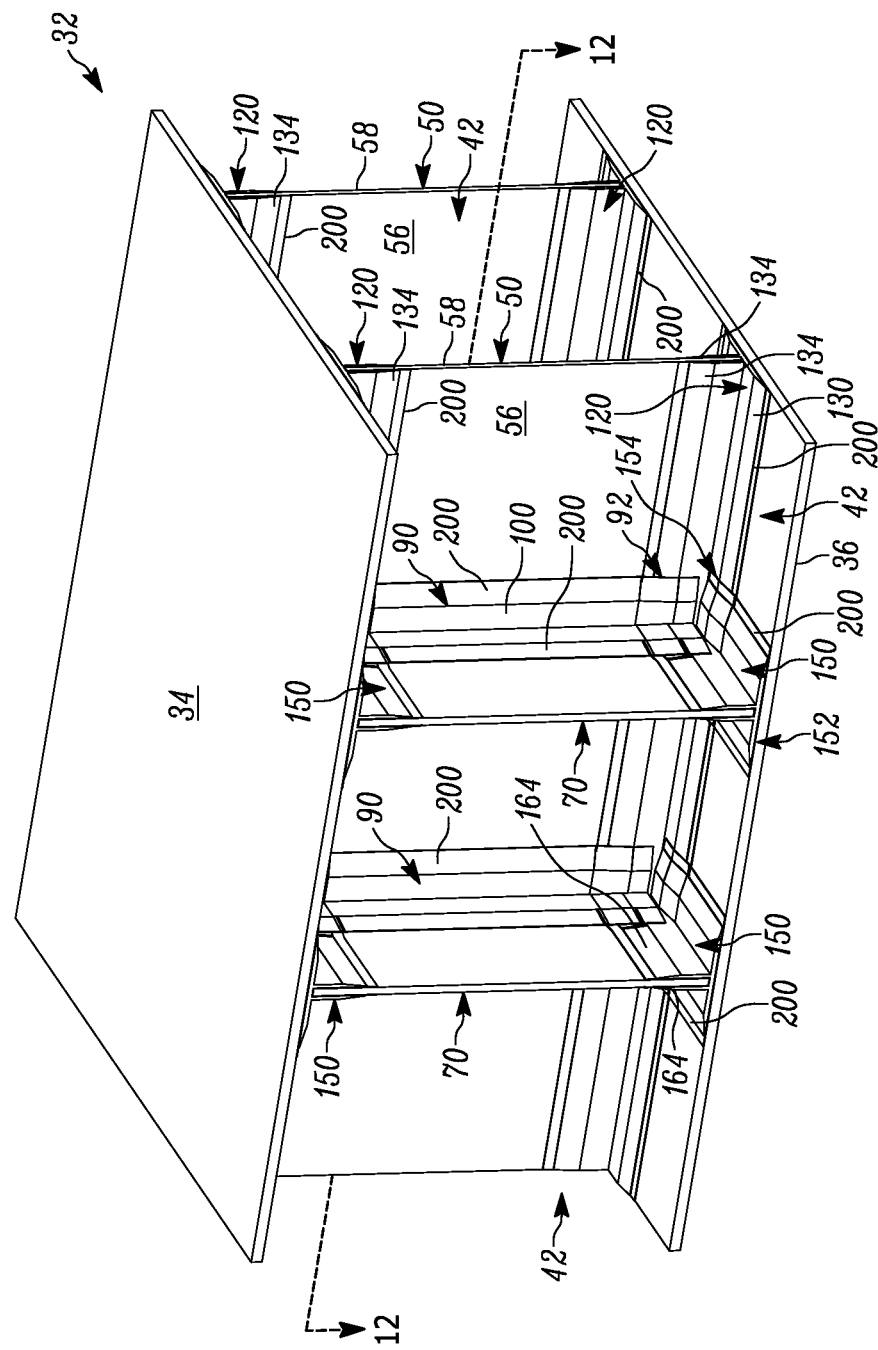
FIG. 2 illustrates a portion of the support structure of FIG. 1.
Figure 3:
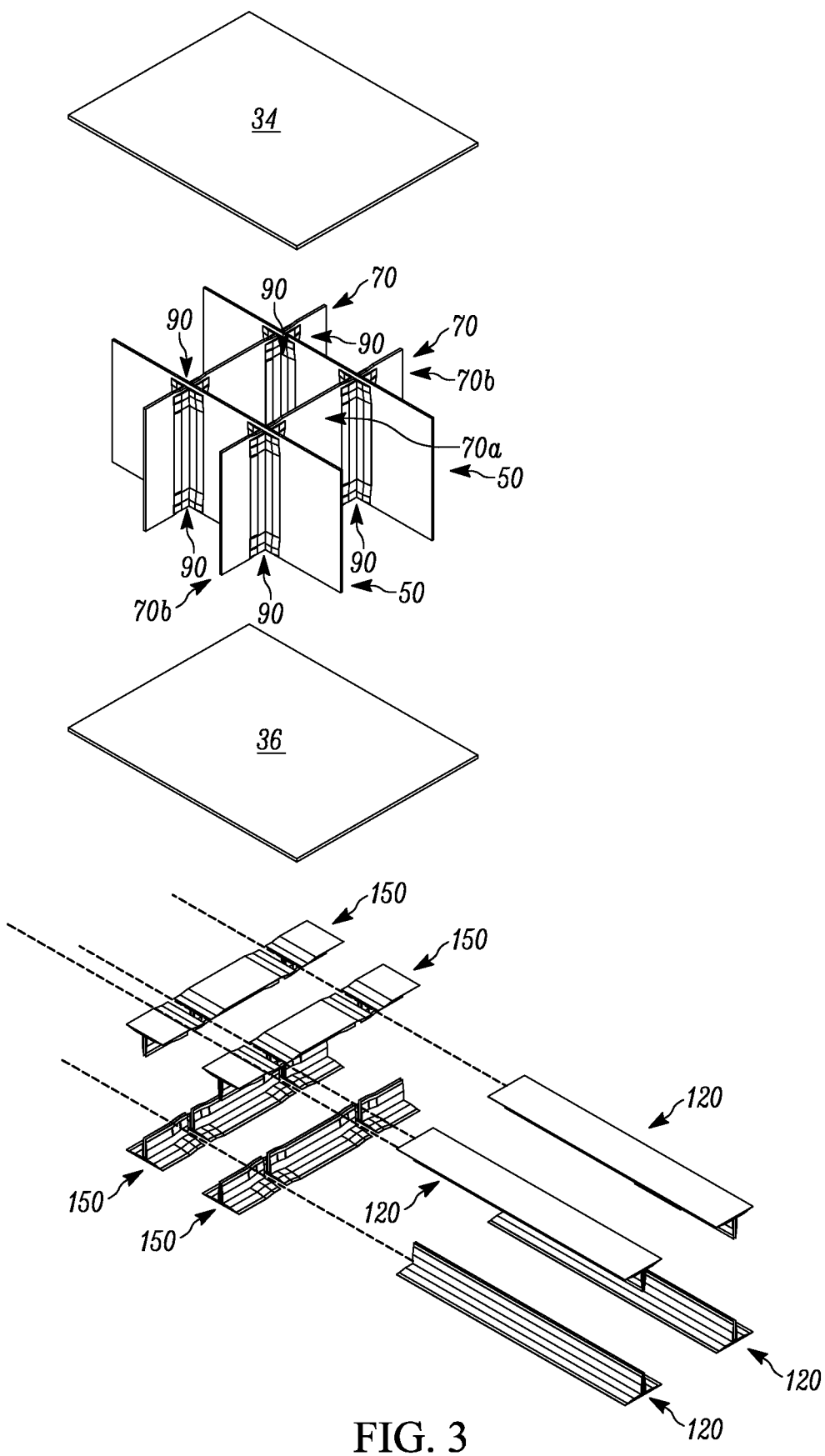
FIG. 3 is an exploded view of the support structure of FIG. 2.

Referring to FIGS. 2-3, the support structure 40 is secured to the skins 34, 36 to increase the durability, rigidity, and wear resistance of the OML 32 in a lightweight, efficient manner. Although the support structure 40 is shown being used in the wing 22 of the aircraft 10, it will be appreciated that the support structure can be configured for other aircraft components, e.g., within the fuselage 20 or tail (not shown).

The support structure 40 includes spars 50 and ribs 70 secured to each spar. As shown, the spars 50 and ribs 70 extend transverse to one another in an array resembling the shape of an egg crate. The support structure 40 defines a series of chambers 44 that can receive, for example, aircraft fuel. Consequently, the support structure 40 is secured to the OML 32 in a fluid-tight manner.

Figure 4A:
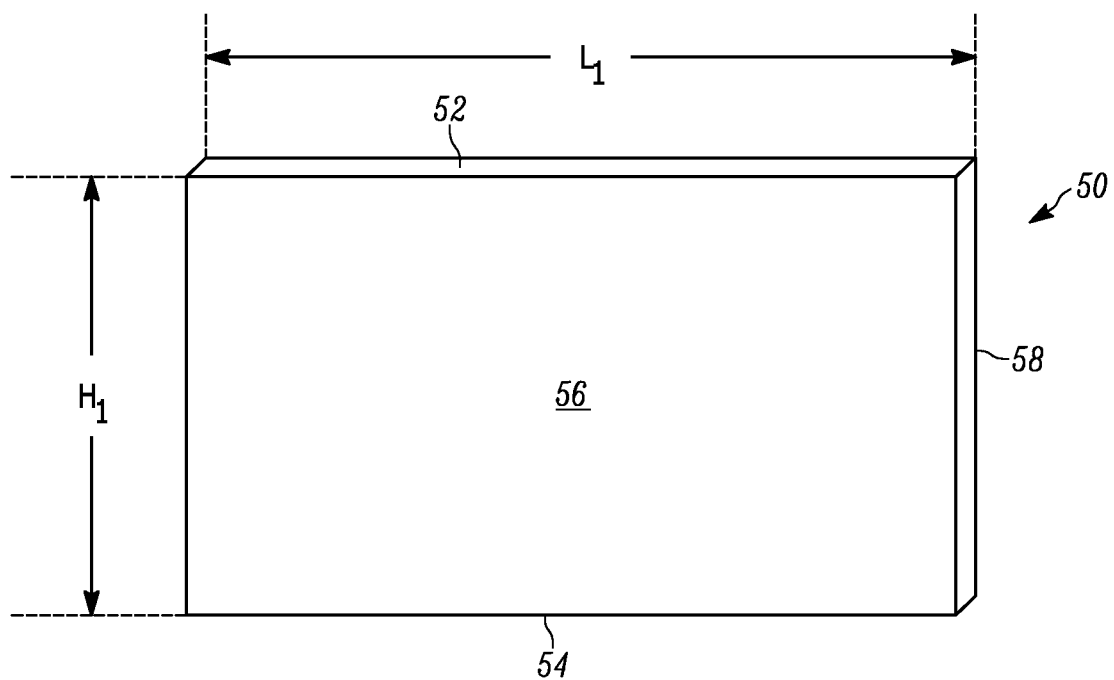
FIG. 4A is a front view of a spar of the support structure of FIG. 2.

Referring to FIG. 4A, each spar 50 is rectangular and has a length indicated at $L_1$ and a height indicated at $H_1$. The spar 50 includes a first edge 52 and second edge 54 extending parallel to the first edge. As shown, the edges 52, 54 are the top and bottom edges of the spar 50—although this orientation can change as the aircraft 20 orientation changes. The spar 50 further includes a first surface 56 and an opposing second surface 58. The spars 50 are formed from carbon fiber, e.g., AS4 carbon fiber, or an epoxy, e.g., 977-3 epoxy resin impregnated fabric.

Figure 4B:
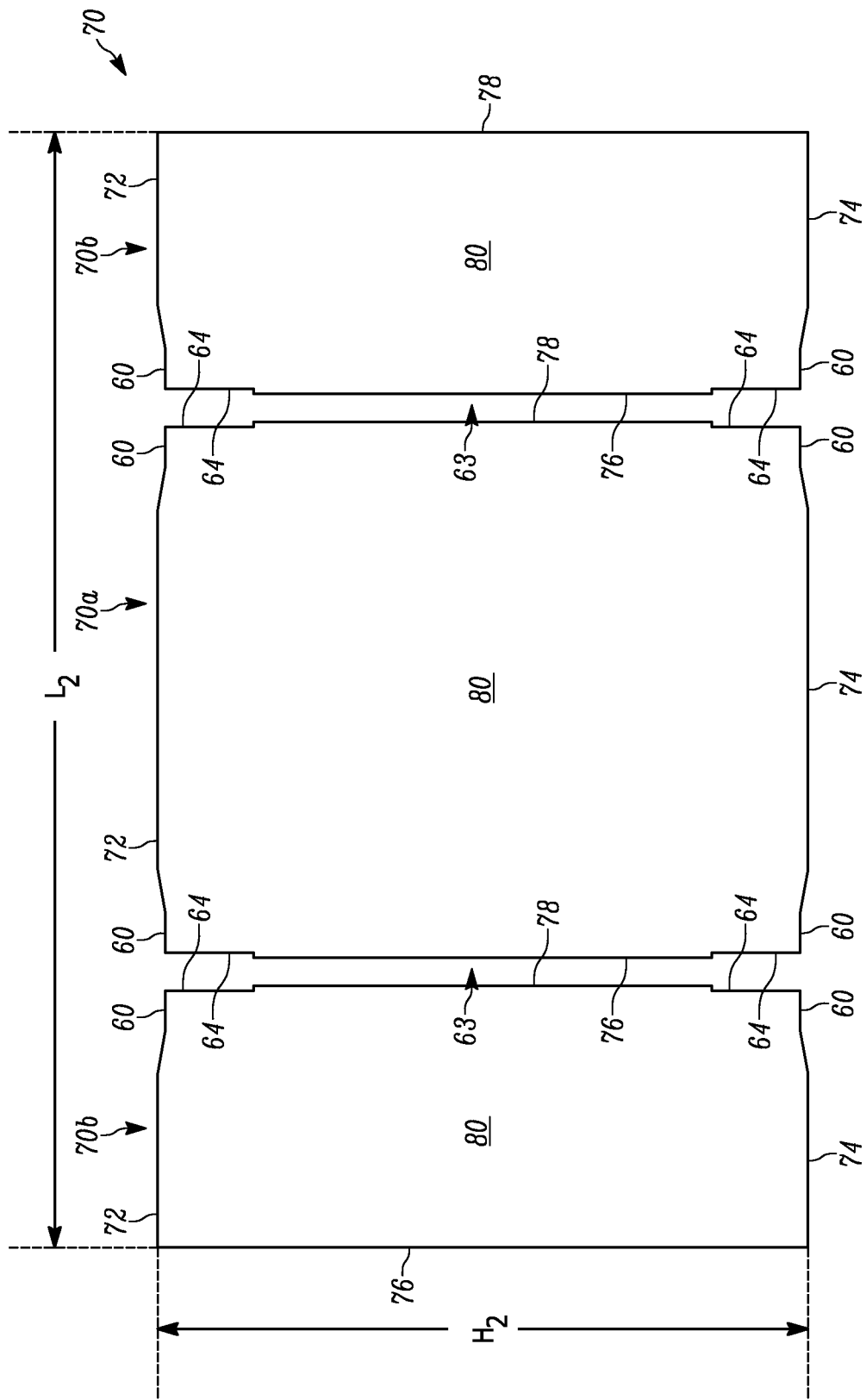
FIG. 4B is a front view of a rib of the support structure of FIG. 2.

As shown in FIG. 4B, each rib 70 is rectangular and has a length indicated at $L_2$ and a height indicated at $H_2$, which is equal or substantially equal to the height $H_1$ of the spar 50. The ribs 70 are formed from carbon fiber, e.g., AS4 carbon fiber, or an epoxy, e.g., 977-3 epoxy resin impregnated fabric. The rib 70 consists of three portions, namely, a first portion 70a and a pair of second portions 70b located on opposite sides of the first portion. The second portions 70b are spaced from the first portion 70a by a gap 63. Each portion 70a, 70b includes a first edge 72 and second edge 74 extending parallel to the first edge. A pair of edges 76, 78 extend from the first edge 72 to the second edge 74. As shown, the edges 72, 74 are the top and bottom edges of each portion 70a, 70b and the edges 76, 78 are lateral edges—although these orientations can change as the aircraft 20 orientation changes. Each portion 70a, 70b further includes a first surface 80 and an opposing second surface (not shown).

Notches 64 are formed along the lateral edges 76, 78 of the first portion 70a adjacent the top and bottom edges 72, 74. Notches 64 are also formed along the lateral edge 76 of each second portion 70b adjacent the top and bottom edges 72, 74. Notches 60 are formed along the top edge 72 and the bottom edge 74 of each portion 70a, 70b adjacent the notches 64.

Figure 5A:
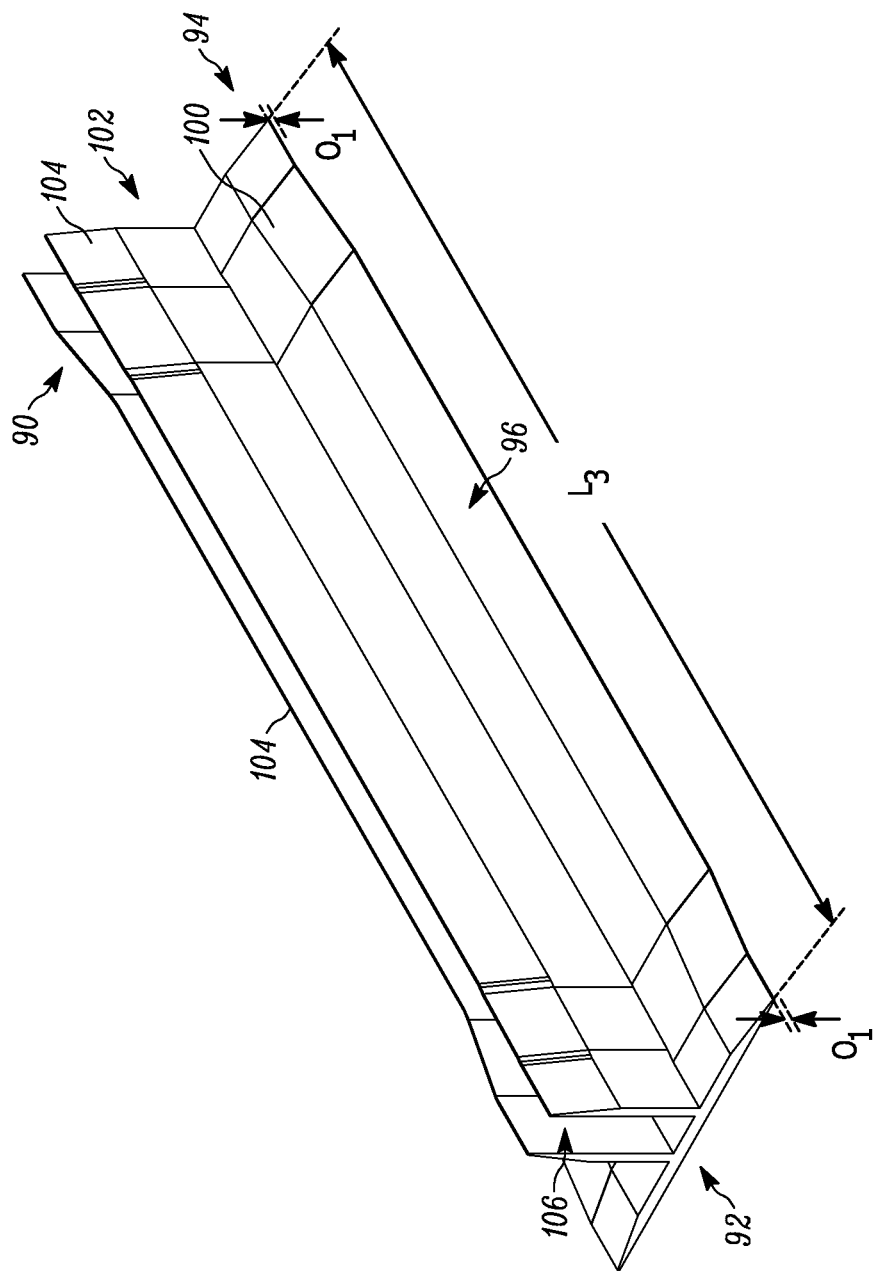
FIGS. 5A-5B illustrate a first pi of the support structure of FIG. 2.
Figure 5B:
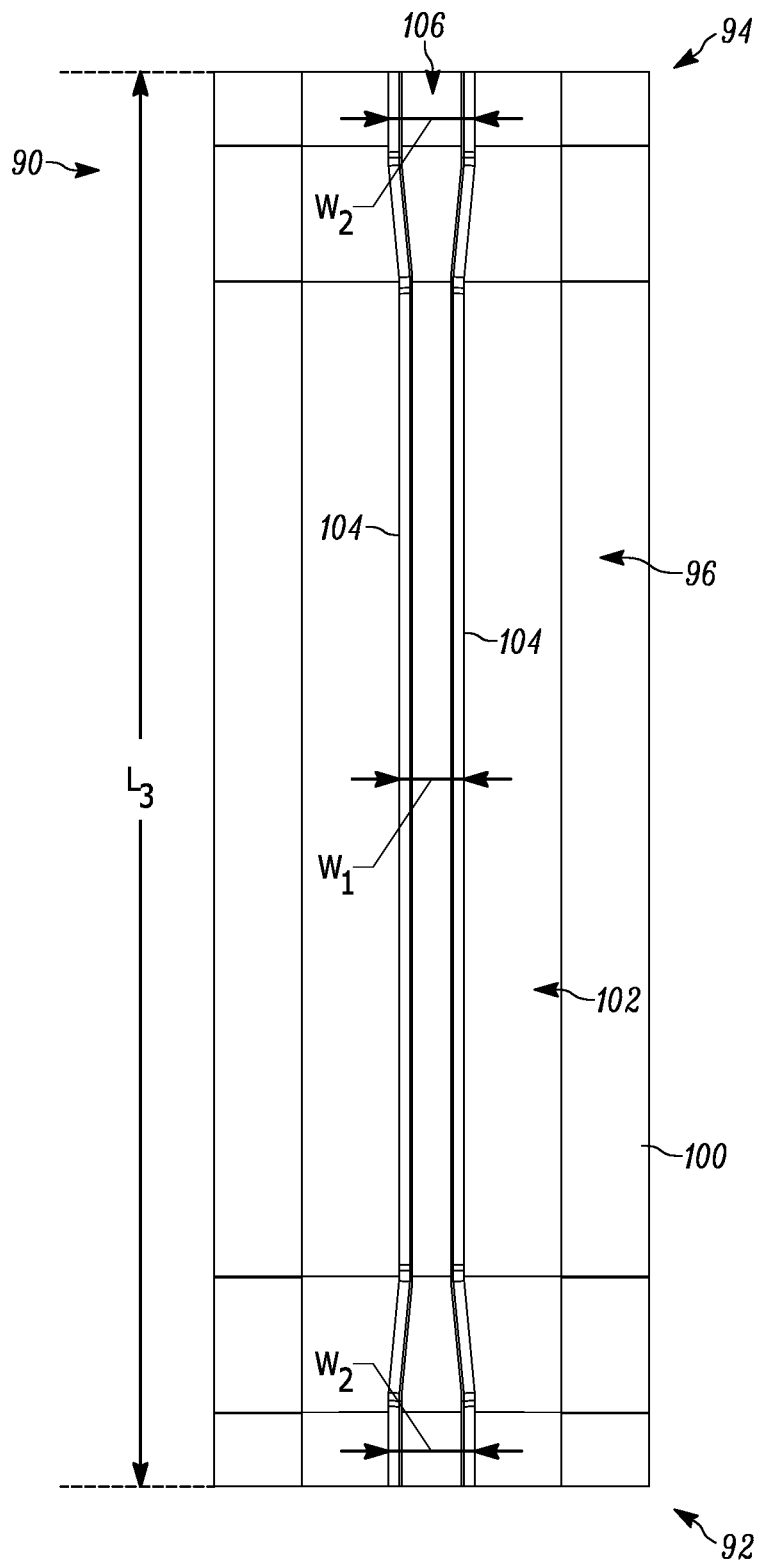

First pis 90 secure the ribs 70 to the spars 50 and act as shear ties between the ribs and spars to prevent relative movement therebetween. As shown in FIGS. 5A-5B, each first pi 90 extends from a first end 92 to a second end 94 to define a length $L_3$. The length $L_3$ is equal to or substantially equal to the height $H_1$ of the spar 50 and the height $H_2$ of the rib 70. A central portion 96 connects the first end second ends 92, 94 together. The first pi 90 has a generally T-shaped cross-section along the length $L_3$.

The first pi 90 includes a rectangular base 100. A clevis 102 extends from the base 100. The clevis 102 includes a pair of arms 104 spaced apart to define a passage 106 extending the entire length $L_3$ of the first pi 90. The arms 104 extend parallel to one another along the central portion 96 of the first pi 90 and flare outward from one another at the ends 92, 94. Consequently, the passage 106 has a first width $w_1$ along the central portion 96 of the first pi 90 and a second width $w_2$ greater than the first width at the ends 92, 94.

Alternatively, the clevis 102 and passage 106 can be shorter than the length $L_3$ (not shown). In any case, the length $L_3$ of the first pi 90 is equal to or substantially equal to the length $L_2$ of the rib 70. The first pi 90 is formed from AS4 carbon fiber 3D perform. The ends 92, 94 of the first pi 90 are bent or offset from the central portion as indicated by $O_1$.

Figure 6:
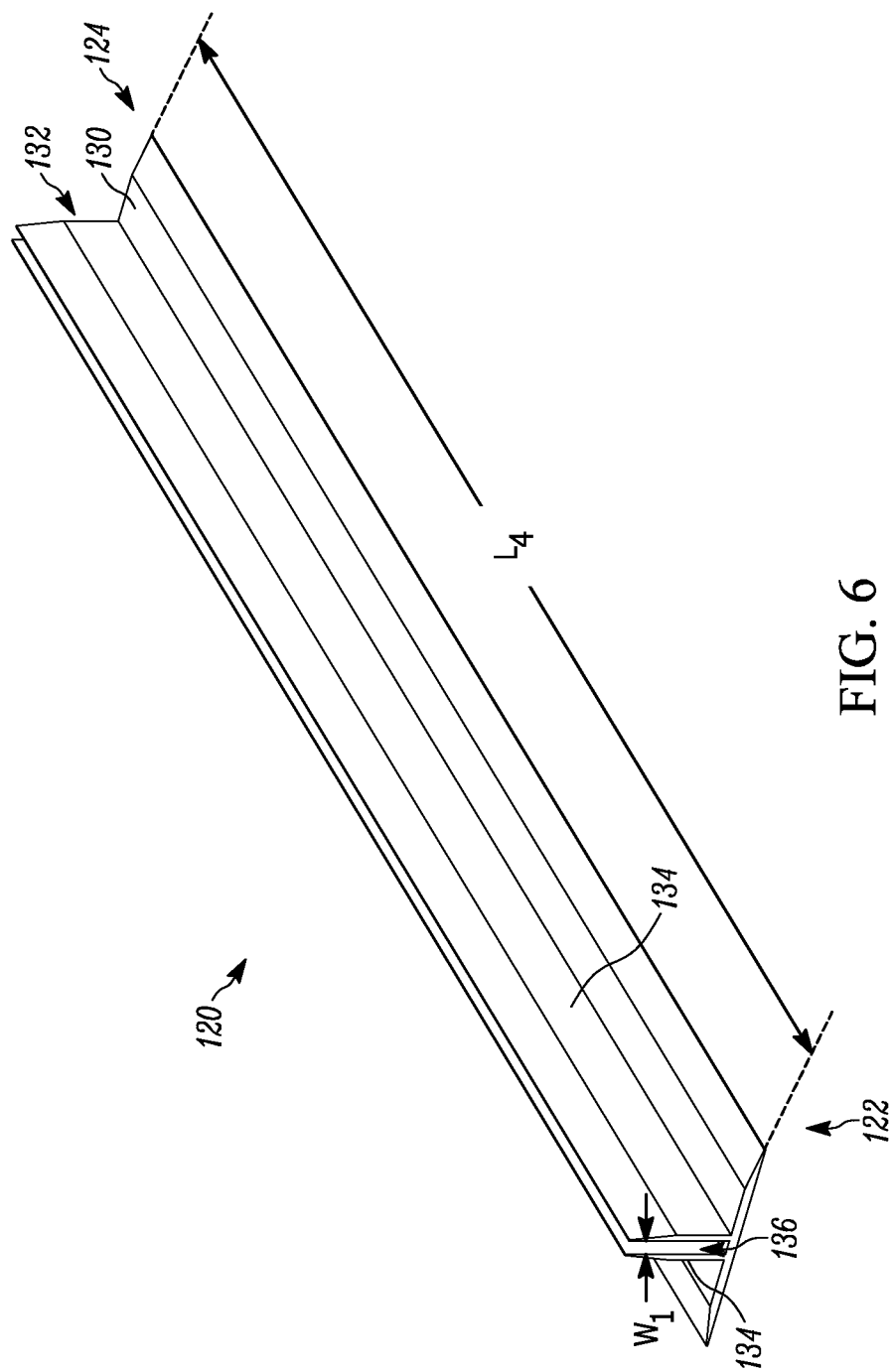
FIG. 6 illustrates a second pi of the support structure of FIG. 2.

Each second pi 120 (FIG. 6) extends from a first end 122 to a second end 124 to define a length $L_4$. The second pi 120 has a generally T-shaped cross-section along the length $L_4$. The length $L_4$ of the second pi 120 is equal to or substantially equal to the length $L_1$ of the spar 50. The second pi 120 is formed from AS4 carbon fiber 3D perform. The second pi 120 includes a rectangular base 130. A clevis 132 extends from the base 130. The clevis 132 includes a pair of arms 134 extending parallel to one another to define a passage 136 extending the entire length $L_4$ of the second pi 120. The arms 134 extend parallel to one another along the entire length L4 the second pi 130. Consequently, the passage 136 has a constant width w1.

Figure 7A:
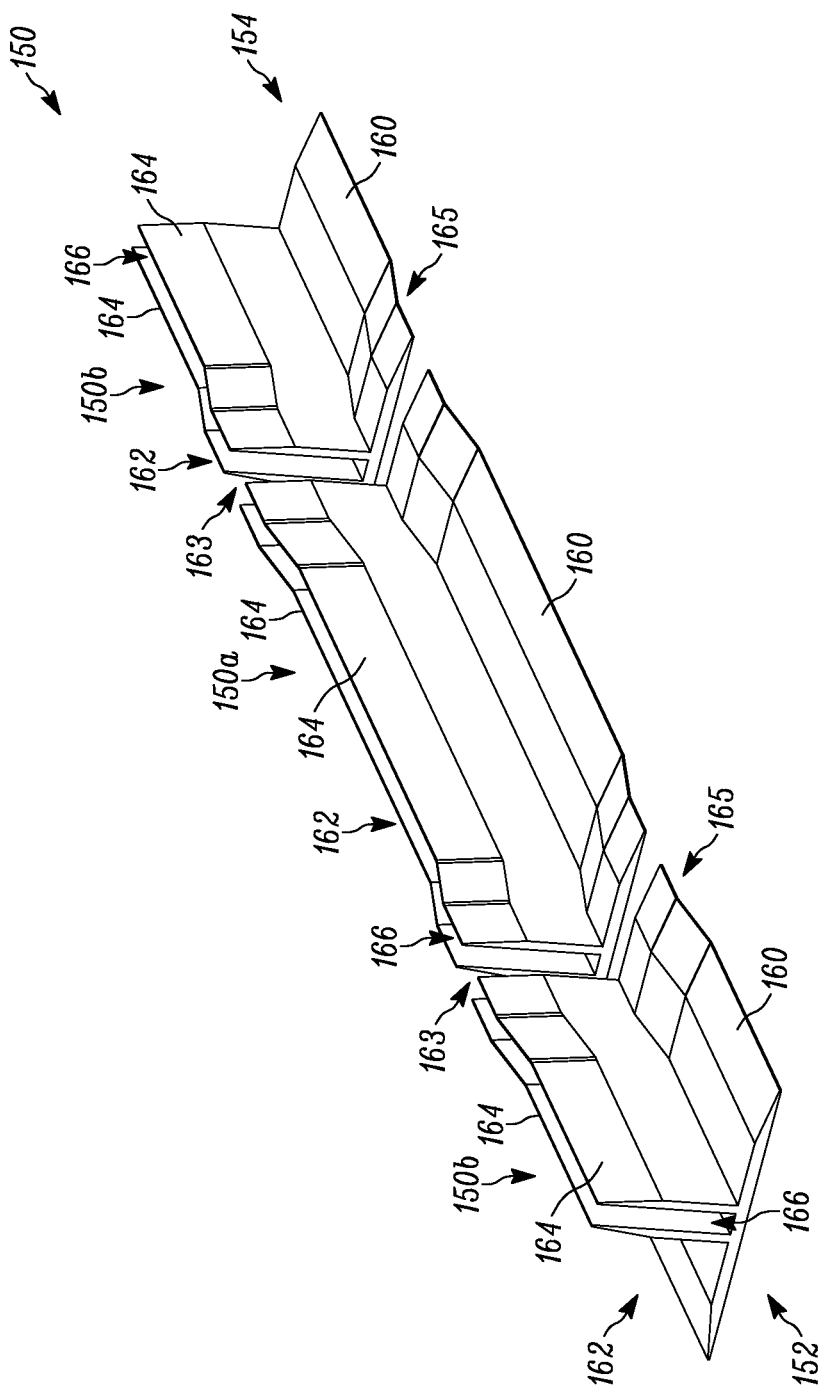
FIGS. 7A-7C illustrate a third pi of the support structure of FIG. 2.
Figure 7B:
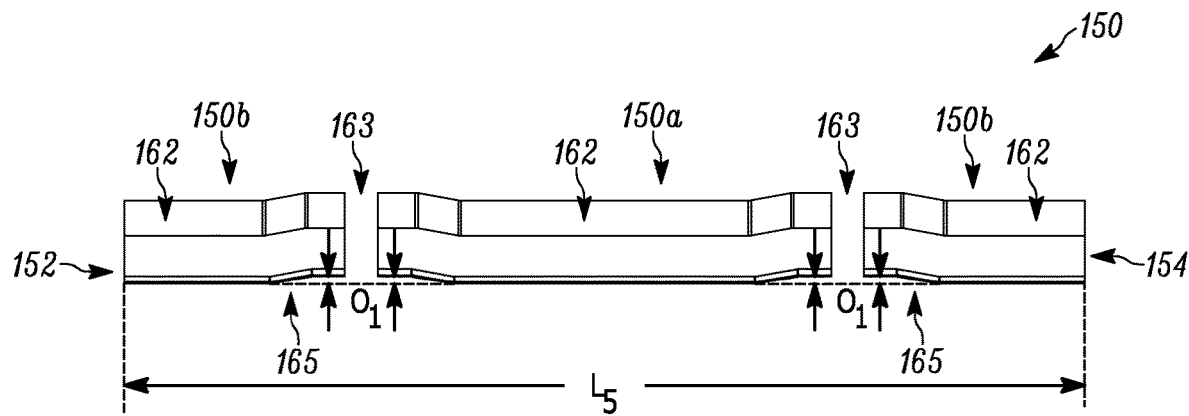
Figure 7C:
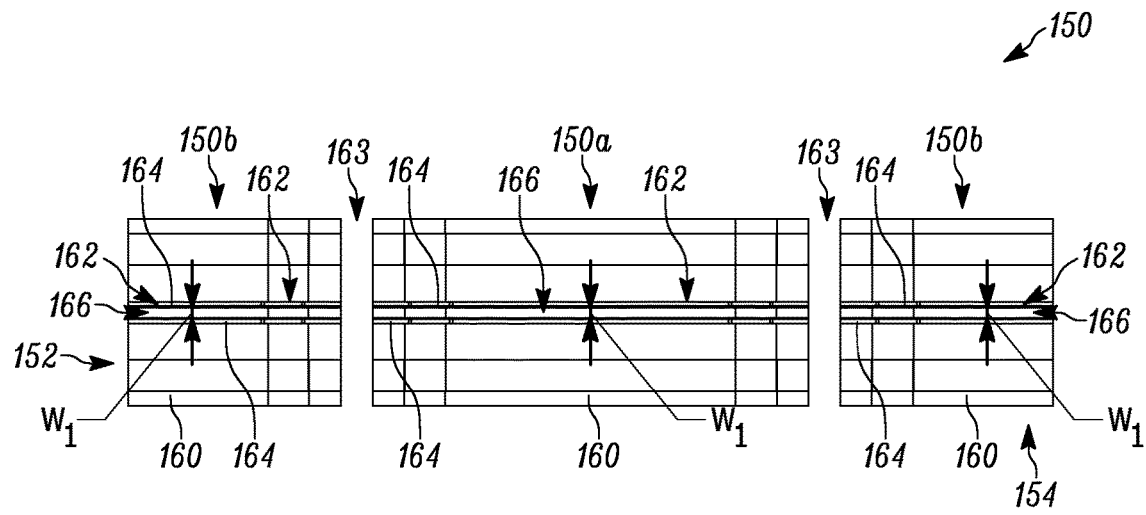

As shown in FIGS. 7A-7C, each third pi 150 extends from a first end 152 to a second end 154 to define a length $L_5$. The length $L_5$ of the third pi 150 is equal to or substantially equal to the length $L_2$ of the rib 70. The third pi 150 is formed from AS4 carbon fiber 3D preform. The third pi 150 has a generally T-shaped cross-section along the length $L_5$. The third pi 150 consists of three portions, namely, a first portion 150a and a pair of second portions 150b located on opposite sides of the first portion. The second portions 150b are spaced from the first portion 150a by a gap 163, which is included in the length $L_5$. Each portion 150a, 150b of the third pi 150 includes a rectangular base 160.

A clevis 162 extends from the base 160. The clevis 162 includes a pair of arms 164 spaced apart to define a passage 166 extending the entire length of each portion 150a, 150b. The arms 164 extend parallel to one another along the entire length of each portion 150a, 150b of the third pi 150. The passage 166 in each portion 150a, 150b has the width $w_1$. Both ends of the first portion 150a are offset from the central portion of the first portion as indicated by $O_1$. An end 165 of each second portion 150b adjacent the first portion 150a is also offset in the manner $O_1$ from the remain second portion.

Figure 8:
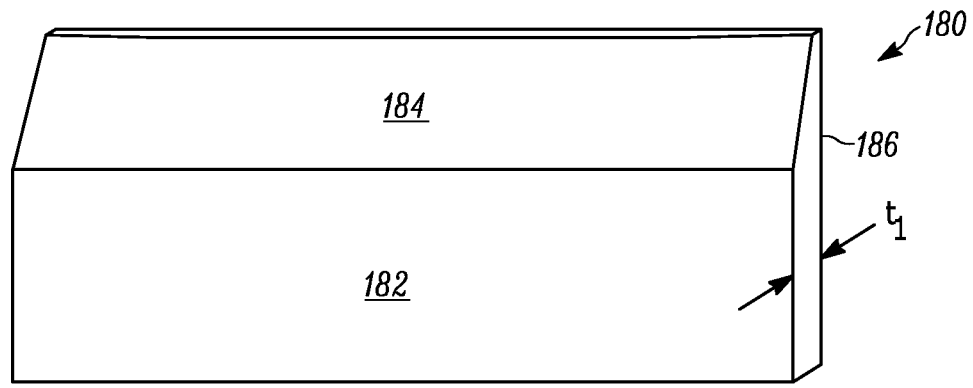
FIG. 8 is an isometric view of a first insert for assembling the support structure of FIG. 22.
Figure 9:
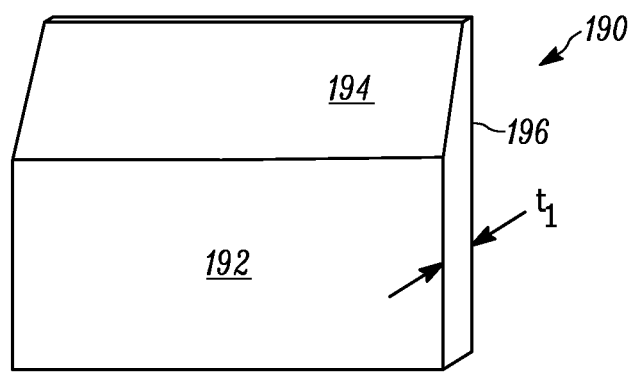
FIG. 9 is an isometric view of a second insert for assembling the support structure of FIG. 2.

First and second spacers or inserts 180, 190 shown in FIGS. 8-9 are used to assemble the support structure 40. Referring to FIG. 8, the insert 180 includes a rectangular portion 182 and a tapered/triangular portion 184 extending therefrom. The portions 182, 184 collectively define a planar surface 186. The insert 180 has a thickness $t_1$ that is constant along the rectangular portion 182 and decreases along the tapered portion 184 in a direction extending away from the rectangular portion.

Referring to FIG. 9, the second insert 190 includes a rectangular portion 192 and a tapered/triangular portion 194 extending therefrom. The portions 192, 194 collectively define a planar surface 196. The insert 190 also has the thickness $t_1$ that is constant along the rectangular portion 182 and decreases along the tapered portion 184 in a direction extending away from the rectangular portion. The thickness $t_1$ corresponds in contour and depth to the offset $O_1$.

Figure 10:
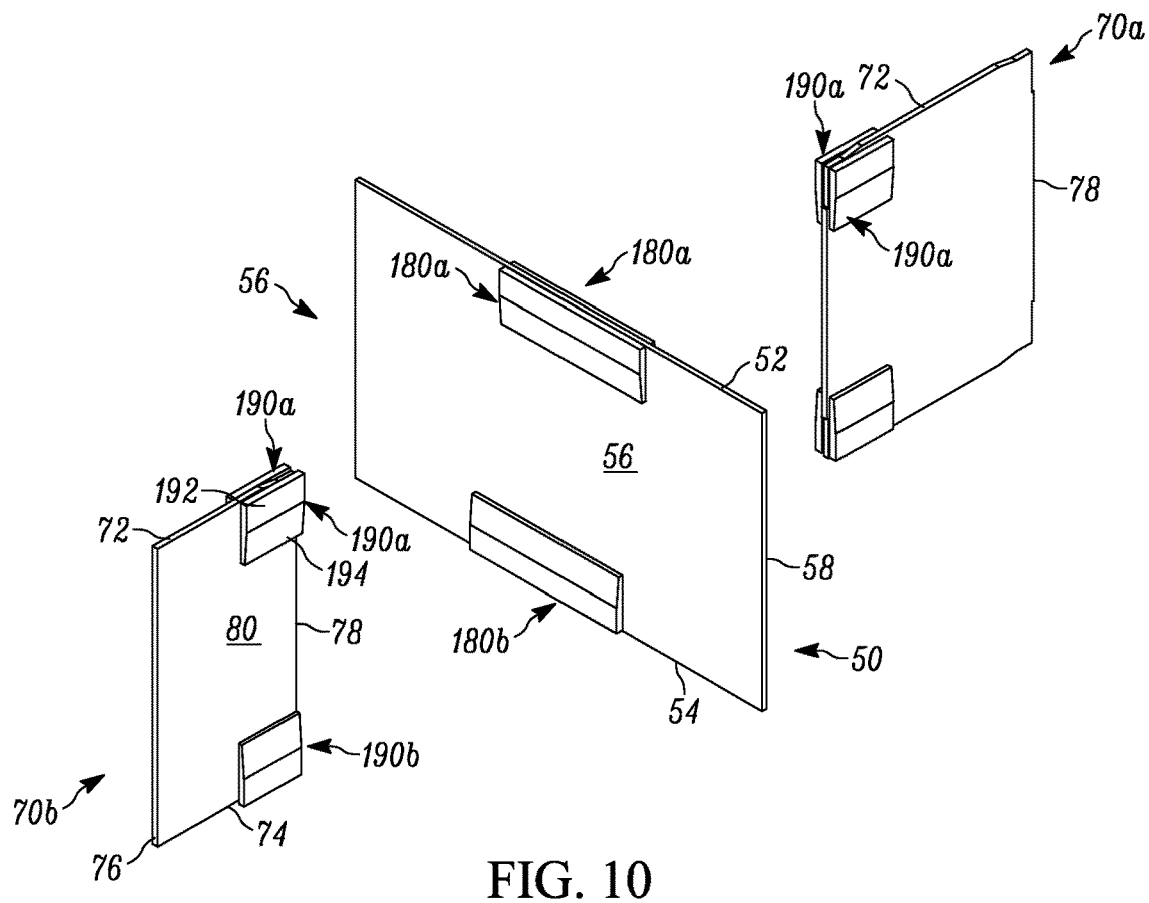
FIG. 10 illustrates a first step of assembling the support structure.
Figure 11A:
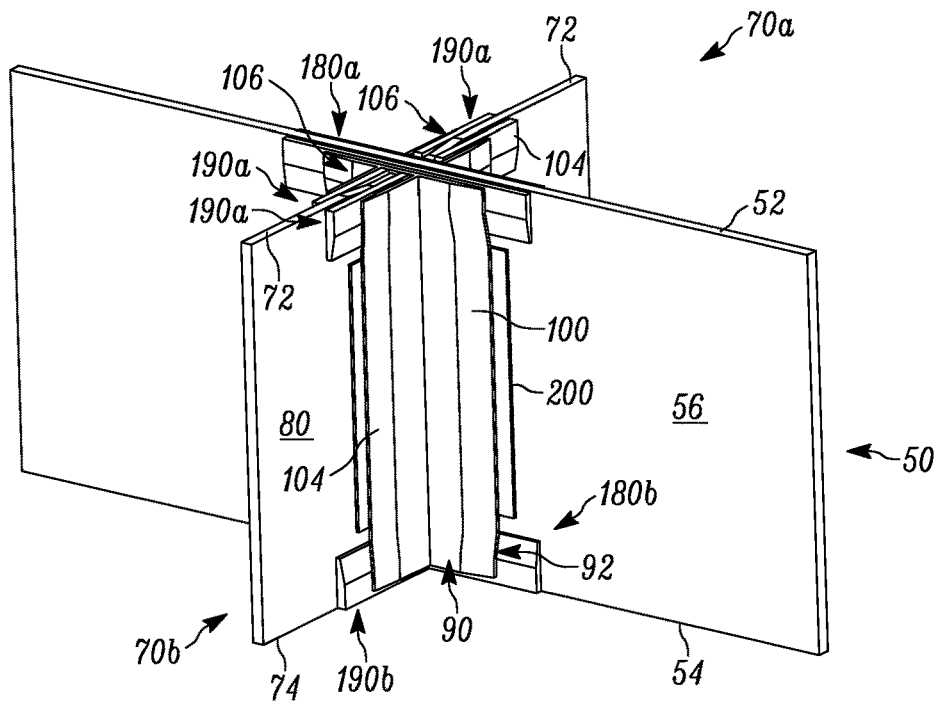
FIG. 11A illustrates a second step of assembling the support structure.
Figure 11B:
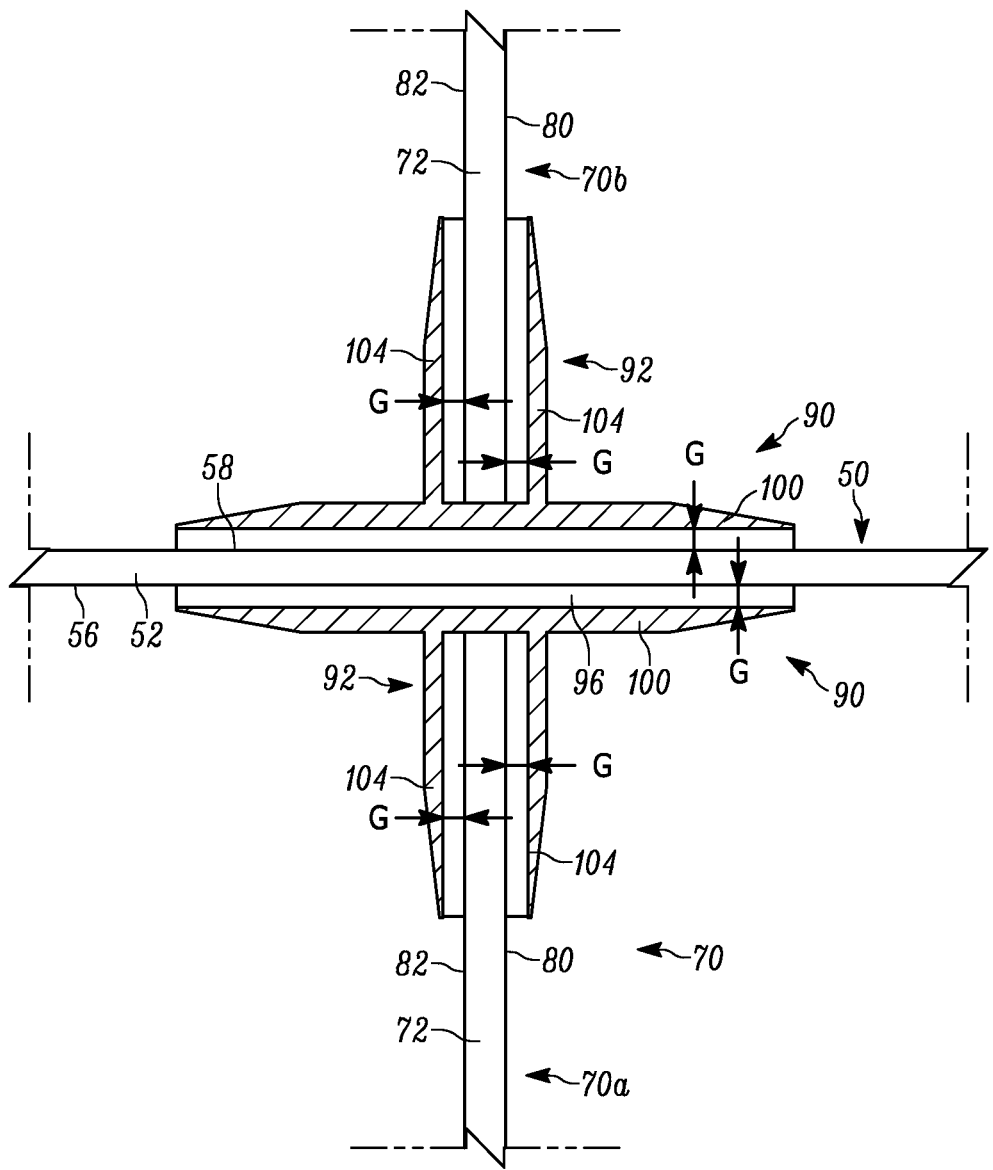
FIG. 11B is a top view of FIG. 11A.

Referring to FIGS. 10-11B, to assemble the support structure 40, the spars 50 are oriented parallel to one another. The portions 70a, 70b of the ribs 70 are positioned between the spars 50 in an alternating manner. More specifically, the second portion 70b of the rib 70 is positioned between the spars 50. The first portions 50a of the rib 70 are positioned laterally outside the spars 50 so as to be coplanar with one another and perpendicular to the spars.

The inserts 180 are secured to opposite sides of each spar 50. The inserts 190 are secured to opposite sides of each rib 70. For the sake of clarity, inserts secured along the top edges 52, 72 of the spar 50 and rib 70, respectively, are given the reference numerals 180a, 190a. Inserts secured along the bottom edges 52, 72 of the spar 50 and rib 70, respectively, are given the reference numerals 180b, 190b. The inserts 180a are secured to the spar 50 adjacent the top edge 52 with a temporary fastener, e.g., a high temperature, double-backed tape. In particular, the surface 186 of one insert 180a is secured to the surface 56 of the spar 50 adjacent the top edge 52 such that the portion 182 is closer than the portion 184 to the top edge.

The surface 186 of another insert 180a is secured to the surface 58 of the spar 50 adjacent the top edge 52 such that the portion 182 is closer than the portion 184 to the top edge. The inserts 180a are symmetrically arranged on opposite sides of the top edge 52. Additional inserts 180b are secured to the surfaces 56, 58 adjacent the bottom edge 54 such that the portions 184 of the inserts on the bottom edge 54 extend/taper inwards towards the portions of the inserts 180a on the top edge 52. The inserts 180a, 180b are positioned along the length L1 of the spar 50 at location(s) where it is desirable to secure ribs 70.

A similar configuration is arranged between the inserts 190a, 190b and each rib 70. The surface 196 of one insert 190a is secured to the surface 80 of the second portion 70b of the rib 70 adjacent the top edge 72 such that the portion 192 is closer than the portion 194 to the top edge. The surface 196 of another insert 190a is secured to the surface 82 of the second portion 70b of the rib 70 adjacent the top edge 72 such that the portion 192 is closer than the portion 194 to the top edge. The inserts 190a are symmetrically arranged on opposite sides of the second portion 70b along the top edge 72. Additional inserts 190b are secured to the surfaces 80, 82 of the second portion 70b adjacent the bottom edge 74 such that the portions 194 of the inserts 190b on the bottom edge 74 extend/taper inwards towards the portions of the inserts 190a on the top edge 72. Each insert 190a, 190b extends over one of the notches 64 in the second portion 70b to the lateral edge 78 and over one of the notches 60 along the top edge 72.

The same process is repeated to secure additional inserts 190 to both surfaces 80, 82 of the first portion 70a of the rib 70 adjacent to both the top edge 72 and the bottom edge 74. Each insert 190 extends over one of the notches 64 in the first portion 70a to the lateral edge 76 of the first portion and over one of the notches 60. Although not shown, it will be appreciated that additional inserts 190 are provided along the lateral edge 78 of the first portion 70a of the rib 70 and along the lateral edge 78 of the remaining second portion 70b (at both the top and bottom edges 72, 74 thereof).

Once the inserts 180, 190 are in place double sided adhesive 200 is secured to both the second portion 70b and the spar 50. Adhesive 200 is wrapped around the lateral edge 78 of the second portion 70b and secured to both surfaces 80, 82 along the height $H_2$ of the second portion between the inserts 190a, 190b secured thereto. Adhesive is also secured to the surface 56 of the spar 50 along the width of the spar between the inserts 180a, 180b secured thereto.

The lateral edge 78 of the second portion 70b is inserted into the clevis 102 of the first pi 90 such that all four inserts 190a, 190b on the second portion 70b extend into the passage 106. When this occurs, the inserts 190a, 190b cause the arms 104 to spread apart to the configuration shown in FIG. 5B, i.e., passage 106 has both the first width $w_1$ and the second width $w_2$. The second width $w_2$ formed between the arms 104 of the first pi 90 corresponds with the thickness $t_1$ of the insert 190 and, thus, the width $w_2$ at each end 92, 94 decreases in the direction extending towards the central portion 96 of the first pi 90 until the inserts 190 no longer engage the first pi. The arms 104 are thereafter spaced apart by the constant width $w_1$.

The base 100 of the first pi 90 is pressed against the adhesive 200 on the surface 56 of the spar 50 and the adhesive 200 on the second portion 70b with the ends 92, 94 of the first pi engaging the inserts 180, 190 secured to the surface 56. As a result, the inserts 180 on the surface 56 cause the ends 92, 94 of the first pi 90 to be spaced from the surface 56, i.e., the offset $O_1$ is formed in the ends 92, 94 relative to the central portion 96 of the first pi 90. The offset $O_1$ formed in the first pi 90 corresponds with the thickness $t_1$ of the insert 180 and, thus, the offset $O_1$ decreases in a direction extending from adjacent the edge 52 towards the edge 54 until the offset $O_1$ becomes zero where the central portion 96 of the first pi 90 engages the surface 56.

The first pi 90, when secured to the surface 56, extends to locations adjacent the top and bottom edges 72, 74 of the second portion 70b. The length $L_3$ of the first pi 90 can thereby be the same as or approximate the height $H_2$ of the second portion 70b.

The same process is repeated with adhesive 200 and an additional first pi 90 to secure the lateral edge 76 of the first portion 70a of the rib 70 to the surface 58 of the spar 50 such that the portions 70a, 70b are coplanar with one another. The lateral edge 78 of the first portion 70a and the remaining second portion 70b of the rib 70 (not shown) are secured to opposite sides of another rib 50 (not shown) in the same manner so as to be coplanar with one another. In other words, every portion 70a, 70b of every rib 70 is secured with adhesive 200 to the spars 50 in generally the same manner for the entire support structure 40. The first pi 90, when secured to the surface 58, extends to locations adjacent the top and bottom edges 72, 74 of the first portion 70a. The length $L_3$ of the first pi 90 can thereby be the same as or approximate the height $H_2$ of the first portion 70a.

Once all the first pis 90 connect the spars 50 and ribs 70 together, the subassembly is heated, which cures the first pis and adhesive 200. This rigidly fixes the shape of the first pis 90. Referring to FIG. 11B, removing the inserts 180 after curing the first pis 90 forms a gap G at each end 92, 94 between the spar 50 and the base 100 of each first pi 90 corresponding to the offset $O_1$. Removing the inserts 190 after curing the first pis 90 also forms a gap G between the rib 70 and each arm 134 at each end 92, 94 of the first pi 90 corresponding to the offset $O_1$. The gap G extends to the central portion 96 of the first pi 90.

Figure 12:
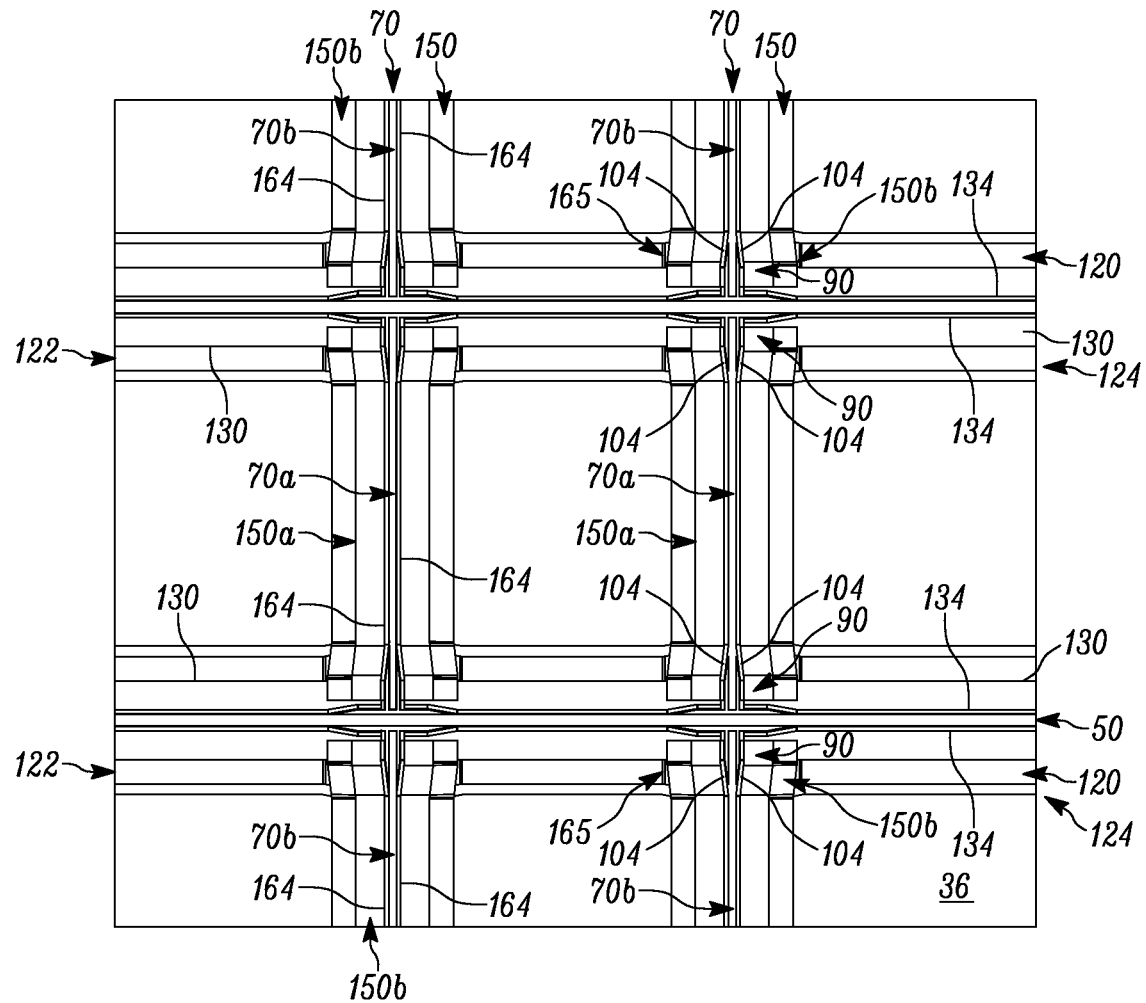
FIG. 12 is a section view taken along line 12-12 of FIG. 2.
Figure 13:
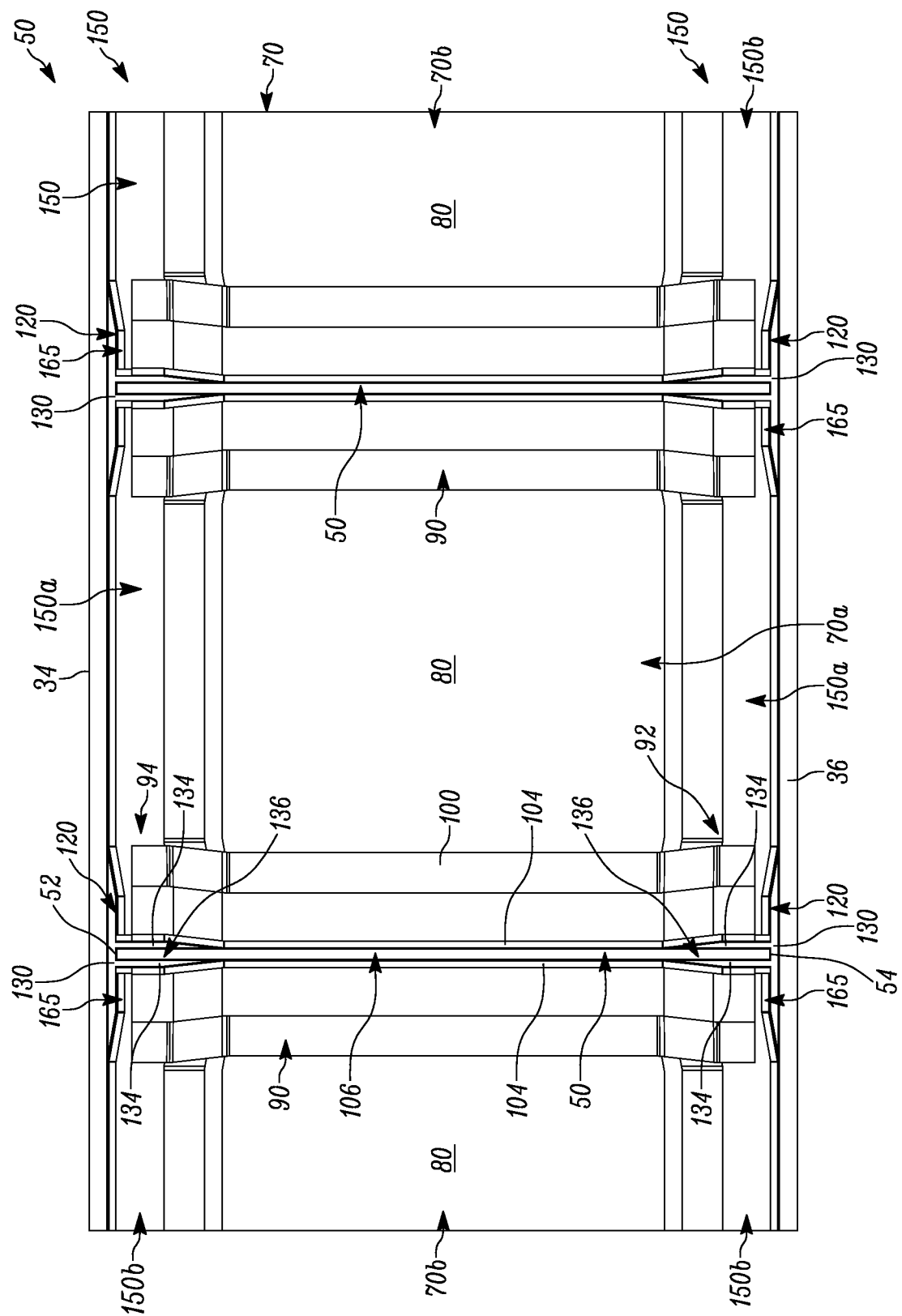
FIG. 13 is a side view of FIG. 2.

Now that the gaps G are formed between the first pis 90, the spars 50, and the ribs 70, the second and third pis 120, 150 can be readily secured to the spars and ribs. Referring to FIGS. 2, 12, and 13, a second pi 120 is longitudinally aligned with the spar 50 and the bottom edge 54 of the spar is inserted into the passage 136 of the second pi 120. Due to the gap G between the end 92 of each first pi 90 and the spar 50, the arms 134 of the second pi 120 pass freely between the ends 92 of the first pis and the surfaces 56 and 58 of the spar 50 along the entire length $L_1$ thereof. In other words, the ends 92 of the first pis 90 do not obstruct or hinder insertion of the spar 50 into the second pi 120. That said, the arms 134 of the second pi 120 extend along the bottom edge 54 and behind the bases 100 of the first pis 90 on opposite sides of the spar 50 along the entire length $L_1$ of the spar. The second pi 120 is secured to the spar 50 along the bottom edge 54 via fastener, adhesive, etc. The end 92 of each first pi 90 can be secured to the clevis 132 of the second pi 120.

When the second pi 120 is secured to the spar 50, it is also received in the notches 64 and notches 60 on the rib 70. One second pi 120 is received by the notches 60, 64 adjacent the bottom edge 74 and lateral edge 78 of the (leftmost) second portion 70b as well as the notches 60, 64 adjacent the bottom edge 74 and lateral edge 76 of the first portion 70a (see FIGS. 4B and 13). Another second pi 120 is received by the notches 60, 64 adjacent the bottom edge 74 and lateral edge 76 of the (rightmost) second portion 70b as well as the notches 60, 64 adjacent the bottom edge 74 and lateral edge 78 of the first portion 70a. In both cases, the base 130 of the second pi 120 extends into the notches 60 and the clevis 132 extends into the notches 64. The portions 70a, 70b of the rib 70 adjacent the bottom edges 74 can then be secured to the second pis 120 via fastener, adhesive, etc.

A third pi 150 is longitudinally aligned with the rib 70 and the bottom edges 74 of the portions 70a, 70b of the rib 70 inserted into the passages 166 of the third pi. More specifically, the bottom edge 74 of the first portion 70a is inserted into the passage 166 in the first portion 150a. The bottom edge 74 of each second portion 70b is inserted into one of the passages 166 in the second portions 150b. Due to the gap G between the end 92 of each first pi 90 and the rib 70, the arms 164 of the third pi 150 pass freely between the ends 92 of the first pis and the surfaces 80 and 82 of the rib 70 along the entire length $L_2$ thereof. In other words, the ends 92 of the first pis 90 do not obstruct or hinder insertion of the portions 70a, 70b of the rib 70 into the portions 150a, 150b of the third pi 150.

That said, the arms 164 of the first portion 150a extend along the bottom edge 74 of the first portion 70a on opposite sides thereof. The portion of the arms 164 at each end of the first portion 70a extends into the gaps G on opposite sides of the first portion 70a. (see FIG. 12). The ends of the first portion 150a extend over and onto the base 130 of the second pis 120. The contour of the offsets $O_1$ in the base 160 mirrors the contour of the bases 130 and, thus, the ends of the first portion 150a readily accommodate the bases 130.

The arms 164 of each second portion 150b extend along the bottom edge 74 of each corresponding second portion 70b on opposite sides thereof. The end 165 of each second portion 150b extends onto the base 130 of one of the second pis 120. The contour of the offset $O_1$ in the base 160 mirrors the contour of the bases 130 and, thus, the ends 165 of the second portion 150b readily accommodate the bases 130. Each second pi 120 therefore extends under/is received by the offset $O_1$ in the first pis 90 and the offset $O_1$ in the third pis 150. Once the pis 120, 150 are secured to the bottom edges 54, 74 of each spar 50 and rib 70, the lower skin 36 is secured to the surfaces of the bases 130, 160 facing away from the spars and ribs.

The process is repeated along the top edges 52, 72 of the spar 50 and rib 70. More specifically, another a second pi 120 is longitudinally aligned with the spar 50 and the top edge 52 of the spar is inserted into the passage 136 of the second pi 120. Due to the gap G between the end 94 of each first pi 90 and the spar 50, the arms 134 of the second pi 120 pass freely between the ends 94 of the first pis and the surfaces 56 and 58 of the spar 50 along the entire length $L_1$ thereof. In other words, the ends 94 of the first pis 90 do not obstruct or hinder insertion of the spar 50 into the second pi 120. That said, the arms 134 of the second pi 120 extend along the top edge 52 and behind the bases 100 of the first pis 90 on opposite sides of the spar 50 along the entire length $L_1$ of the spar. The second pi 120 is secured to the spar 50 along the top edge 52 via fastener, adhesive, etc. The end 94 of each first pi 90 can be secured to the clevis 132 of the second pi 120.

One second pi 120 is received by the notches 60, 64 adjacent the top edge 72 and lateral edge 78 of the (leftmost) second portion 70b as well as the notches 60, 64 adjacent the top edge 72 and lateral edge 76 of the first portion 70a (see FIGS. 4B and 13). Another second pi 120 is received by the notches 60, 64 adjacent the top edge 72 and lateral edge 76 of the (rightmost) second portion 70b as well as the notches 60, 64 adjacent the top edge 72 and lateral edge 78 of the first portion 70a. In both cases, the base 130 of the second pi 120 extends into the notches 60 and the clevis 132 extends into the notches 64. The portions 70a, 70b of the rib 70 adjacent the top edges 72 can then be secured to the second pis 120 via fastener, adhesive, etc.

A third pi 150 is longitudinally aligned with the rib 70 and the top edges 72 of the portions 70a, 70b of the rib 70 inserted into the passages 166 of the third pi. More specifically, the top edge 72 of the first portion 70a is inserted into the passage 166 in the first portion 150a. The top edge 72 of each second portion 70b is inserted into one of the passages 166 in the second portions 150b. Due to the gap G between the end 94 of each first pi 90 and the rib 70, the arms 164 of the third pi 150 pass freely between the ends 94 of the first pis and the surfaces 80 and 82 of the rib 70 along the entire length $L_2$ thereof. In other words, the ends 94 of the first pis 90 do not obstruct or hinder insertion of the portions 70a, 70b of the rib 70 into the portions 150a, 150b of the third pi 150.

That said, the arms 164 of the first portion 150a extend along the top edge 72 of the first portion 70a on opposite sides thereof. The portion of the arms 164 at each end of the first portion 70a extends into the gaps G on opposite sides of the first portion 70a. (see FIG. 12). The ends of the first portion 150a extend over and onto the base 130 of the second pis 120. The contour of the offsets $O_1$ in the base 160 mirrors the contour of the bases 130 and, thus, the ends of the first portion 150a readily accommodate the bases 130.

The arms 164 of each second portion 150b extend along the top edge 72 of each corresponding second portion 70b on opposite sides thereof. The end 165 of each second portion 150b extends onto the base 130 of one of the second pis 120. The contour of the offset $O_1$ in the base 160 mirrors the contour of the bases 130 and, thus, the ends 165 of the second portion 150b readily accommodate the bases 130. Each second pi 120 therefore extends under/is received by the offset $O_1$ in the first pis 90 and the offset $O_1$ in the third pis 150. Once the pis 120, 150 are secured to the top edges 52, 72 of each spar 50 and rib 70, the upper skin 34 is secured to the surfaces of the bases 130, 160 facing away from the spars and ribs. When the support structure 40 is completely secured between and to the skins 34, 36 the support structure cooperates with the skins to form the fuel storage chambers 44.

The present invention is advantageous in that the pis 90, 120, 150 are secured to the spars 50 and ribs 70 and are stacked atop one another in an efficient, space saving manner. As shown in FIGS. 2, 12, and 13, the third pis 150 extend over/overlap the second pis 120 and the first pis 90 extend over/overlap both the second pis and the third pis. The overlapping configuration is possible due to the gaps G and offsets $O_1$ provided in and between the spars 50, ribs 70, and pis 90, 120, 150.

The configuration of the pis 90, 120, 150 allows the support structure 40 to be constructed in a lighter and cheaper manner than current support structures while maintaining structural support and rigidity for the support structure. In particular, using first pis 90 that have lengths $L_3$ equal to or approaching the entire height $H_2$ of the rib 70 (and thereby the entire height of the support structure 40) maximizes the structural integrity of the interface between the spars 50 and ribs 70. More specifically, the longer first pis 90 increase the contact area between the first pis and the second pis 120 and/or third pis 150, which maximizes the bond strength therebetween. The longer first pis 90 also help maintain sealing integrity of the fuel storage chambers 42 by mitigating or eliminating the need for additional sealing components and/or steps.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:
1. A support structure for reinforcing first and second skins in an aircraft component, comprising:
   a plurality of spars;
   a plurality of ribs positioned on opposite sides of the spars, each rib having a height extending from adjacent the first skin to adjacent the second skin;
   a plurality of first pis connecting the ribs to the spars with each first pi having a length and the spars extending entirely through the first pis to opposite sides of the ribs;
   a plurality of second pis securing the spars to the first and second skins; and
   a plurality of third pis securing the ribs to the first and second skins, wherein the first pis overlap with at least one of the second pis or the third pis.

2. The support structure recited in claim 1, wherein each first pi has a length equal to the height of the rib connected thereto.

3. The support structure recited in claim 1, wherein each first pi includes a first end and a second end, each of the first and second ends overlapping with at least one of the second pis or the third pis such that at least one of the second pis or third pis extend into the first pis.

4. The support structure recited in claim 1, wherein the first pis, second pis, and third pis overlap and extend into passages of one another.

5. The support structure recited in claim 1, wherein the second pis extend the entire length of each spar.

6. The support structure recited in claim 1, wherein the second pis extend into passages of the first pis.

7. The support structure recited in claim 1, wherein the second pis extend into passages of the third pis.

8. The support structure recited in claim 1, wherein each first pi includes a base secured to one of the spars and a clevis for receiving one of the ribs.

9. The support structure recited in claim 5, wherein each first pi includes a first end, a second end, and a central portion extending between the first and second ends, each of the first and second ends being offset relative to the central portion to define a gap between each end and the spar for receiving one of the second pis.

10. The support structure recited in claim 5, wherein the clevis on the first pi includes a pair of arms, an end of each arm being offset relative to a central portion of each arm to define a gap between each arm and the rib for receiving one of the third pis.

11. The support structure recited in claim 1, wherein each second pi includes a base secured to one of the first and second skins and a clevis for receiving one of the spars.

12. The support structure recited in claim 1, wherein each third pi includes a base secured to one of the first and second skins and a clevis for receiving one of the ribs.

13. The support structure recited in claim 1, wherein the first pis are formed from fabric.

14. The support structure recited in claim 1, wherein the first, second, and third pis are secured to the spar and ribs with adhesive.

15. A support structure for reinforcing first and second skins in an aircraft component, comprising:
a plurality of spars;
a plurality of ribs positioned on opposite sides of the spars, each rib having a height extending from adjacent the first skin to adjacent the second skin;
a plurality of first pis connecting the ribs to the spars, each first pi extending from a first end to a second end to define a length and the spars extending entirely through the first pis to opposite sides of the ribs;
a plurality of second pis securing the spars to the first and second skins; and
a plurality of third pis securing the ribs to the first and second skins, wherein both the first end and the second end of the first pis overlap with the second pis and the third pis.

16. The support structure recited in claim 15, wherein the first pis extend the entire height of the ribs between and first and second skins.

17. The support structure recited in claim 15, wherein each first pi includes a base secured to one of the spars and a clevis for receiving one of the ribs.

18. The support structure recited in claim 17, wherein each first pi includes a first end, a second end, and a central portion extending between the first and second ends, each of the first and second ends being offset relative to the central portion to define a gap between each end and the spar for receiving one of the second pis.

19. The support structure recited in claim 17, wherein the clevis on the first pi includes a pair of arms, an end of each arm being offset relative to a central portion of each arm to define a gap between each arm and the rib for receiving one of the third pis.

20. The support structure recited in claim 15, wherein the second and third pis extend into passages in the first pis.

* * * * *